Patented Dec. 22, 1931

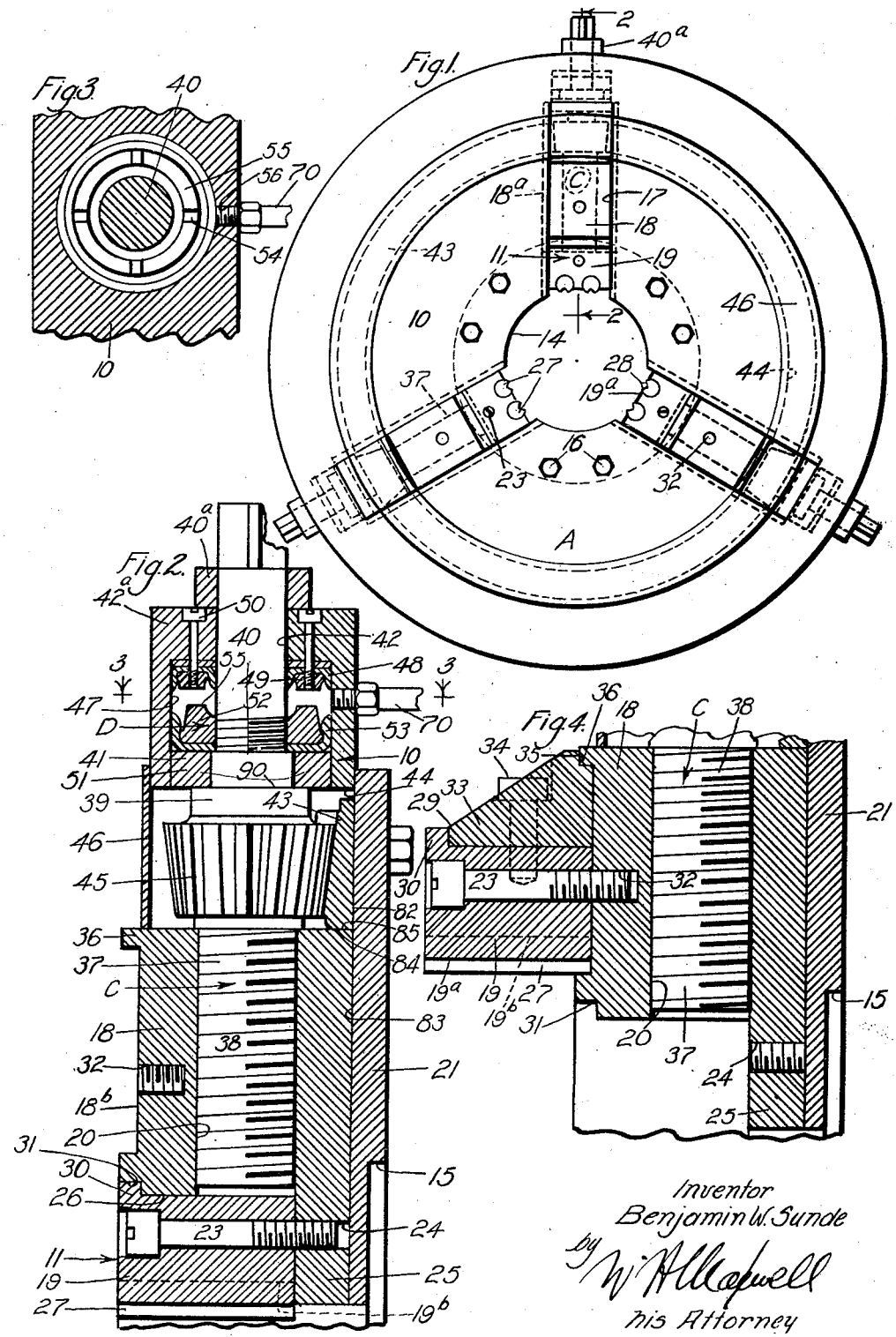

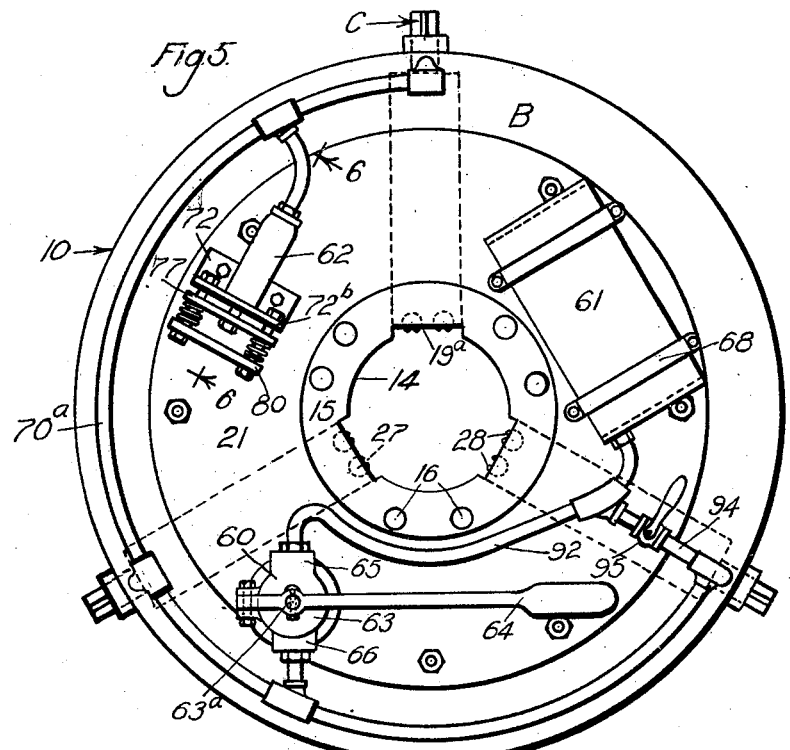
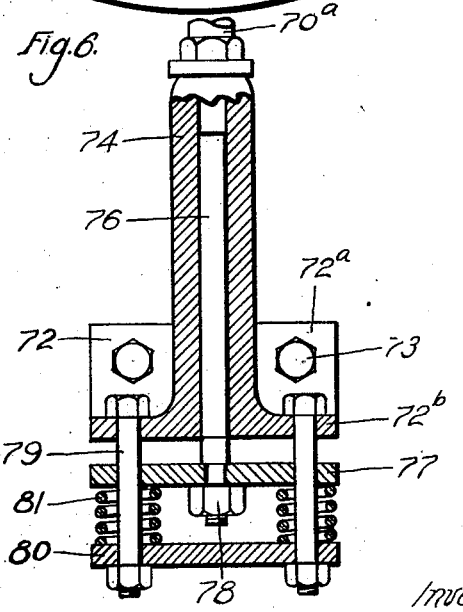

1,837,688

UNITED STATES PATENT OFFICE

BENJAMIN W. SUNDE, OF LONG BEACH, CALIFORNIA, ASSIGNOR TO BLACKWELL AND SUNDE, INCORPORATED, OF LONG BEACH, CALIFORNIA, A CORPORATION OF CALIFORNIA

CHUCK

Application filed January 14, 1929. Serial No. 332,488.

This invention has to do with a chuck and it is a general object of the invention to provide a chuck or gripping device embodying mechanical and fluid pressure clamping means.

It is often necessary to clamp pipe, or other articles in a chuck with great force to grip them securely enough to perform certain types of work. For instance, when it is desired to uncouple parts of a well drilling string after the string has been used in drilling operations and the joints have become set, it is the general practice to break or loosen the joints by clamping one part in a chuck and securely gripping the other part by means of pipe tongs, or the like, and turning the chuck. It has been found that the common types of lathe chucks are inadequate for this purpose as they fail to grip the pipe securely enough, and will not withstand this heavy work.

It is a primary object of this invention to provide an improved chuck adapted to securely and dependably grip objects for the class of work above referred to.

Another object of this invention is to provide a chuck having interconnected manual means operable to actuate gripping jaws and fluid pressure means operable to cooperate with the manual means in operating the jaws.

Another object of this invention is to provide a device of the character mentioned having fluid pressure jaw actuating means embodying a pressure accumulator, whereby pressure is maintained on the jaws.

Another object of the invention is to provide a device of the character mentioned above in which the manual clamping means and the fluid pressure clamping means may be operated separately.

Another object of the invention is to provide a unitary device of the character mentioned embodying means to develop fluid pressure.

The various objects and features of my invention will be best and more fully understood from the following detailed description of a typical preferred form of the invention, throughout which description reference is had to the accompanying drawings in which:

Fig. 1 is a face or front elevation of the device provided by this invention. Fig. 2 is an enlarged detailed sectional view taken as indicated by line 2—2 on Fig. 1. Fig. 3 is a detailed sectional view taken as indicated by the line 3—3 on Fig. 2. Fig. 4 is an enlarged detailed sectional view similar to a portion of Fig. 2 showing a different positioning of the parts. Fig. 5 is a rear view of the device, and Fig. 6 is an enlarged detailed sectional view taken as indicated by line 6—6 on Fig. 5.

The device includes, generally, a body 10 to be mounted on the spindle of a lathe or the like, jaws 11 carried by the body to grip work such as a pipe, or the like, manual means C operable to actuate the jaws, and fluid pressure means D operable to actuate the jaws.

The device provided by this invention may be embodied in different forms. In the following detailed description a typical preferred form of the invention will be described. The body 10 of the preferred form of the invention is annular in its general configuration and is in the form of a plate having front and rear sides A and B, respectively. The body is provided with a central opening 14 adapted to pass the work. The body may be provided with suitable means for mounting it on a lathe or like machine. In the construction illustrated this means includes a central annular recess 15 in the rear side of the body to receive the centering or face plate of the lathe or machine, and spaced bolt holes 16 extending transversely through the body adjacent the periphery of the recess.

The clamping jaws 11 provided to grip the work are carried in spaced openings or guideways 17 provided in the body. The guideways are symmetrically disposed around the center of the body and are disposed to carry the jaws so that they move radially with reference to the central axis of the body. There may be any number of jaws and guideways to carry the jaws. In the preferred form of the invention illustrated in the drawings, I have shown three jaws equally spaced around the axis of the body. Each jaw includes, generally, a block 18 slidably carried in the radial guideway 17, and a detachable gripping element 19 carried by the block 18. The block 18 is substantially rectangular and has sides 18ª which are slidably recessed in the walls of the guideway 17. The block 18 is slidably carried in the guideway 17 for radial movement and slidably engages a plate 21 attached to the rear side B of the body. The plate 21 closes the guideways at the rear of the body.

The gripping element 19 is adapted to be detachably mounted in either of two positions on the block, one position being on the inner end of the block 18 and the other on the front side of the block 18. The inner face 19ª of the element 19 is provided with gripping parts or dies 27 provided with teeth 28 adapted to grip the work. The dies 27 are carried in openings 19ᵇ in the inner face 19ª of the gripping element so that their teeth project beyond the gripping element.

Each element 19 is adapted to be attached to the block 18 by means of a bolt 23 adapted to screw thread into either of two openings in the block 18. When the element 19 is at the inner end of the block 18, the bolt 23 threads into an opening 24 in an inward extension 25 of the block. When the element 19 is in this position it engages the extending part 25 and also the inner end 26 of the block 18. A flange 30 is provided on the outer side of the gripping element and fits in a recess 31 in the block 18.

When the gripping element 19 is attached to the front 18ᵇ of the block 18 the bolt 23 screw threads into an opening 32 in the block and clamps the element 19 against the front of the block 18. A brace 33 may be provided to further hold the gripping element in position on the front of the block. The brace 33 may be in the form of a bracket-like member to be attached to the outer part of the gripping element by means of a bolt 34 screw threaded into the gripping block. The brace fits the corner formed between the outer part of the element 19 and the front 18ᵇ of the block 18. The brace is provided with a recess 35 to receive a flange 36 on the block 18. The outer end 29 of the brace engages the inner face of the flange 30.

The manual operable means C for actuating the jaws includes screws 37, one operating each jaw. Each screw 37 has, generally, a threaded body 38, a head 39 at the outer end of the body 38, and a stem 40 projecting outwardly from the head. The threaded body 38 of the screw extends longitudinally through the guideway and threads into an opening 20 formed in the jaw block 18. The opening 20 and the screw 37 carried in the opening, are arranged parallel with the sides of the block 18. That is, they are radially disposed with reference to the central axis of the body.

The head portion 39 of the screw 37 is adjacent the outer end of the threaded portion 38, and is located beyond the outer end of the block 18. The head 39 is in the form of an enlargement of the screw and has an outer shoulder 90 forming an abutment for a piston 41 carried in the stem 40.

The stem 40 of the screw is in the form of an extension projecting outwardly from the head to a point beyond the periphery of the body 10. The stem 40 is round in cross section and passes through an opening 42 provided in a wall 42ª in the outer end of the body. A collar 40ª is provided on the stem and engages the periphery of the body 10. The outer end of the stem is provided with flat faces adapted to be engaged by a wrench or like operating tool.

The operating screws may be interconnected to operate simultaneously when any one screw is operated. This may be done by means of a ring gear 43 meshing with pinion gears 45 on the screws. In the preferred form of the invention illustrated in the drawings the ring gear 43 is slidably carried in an annular groove 44 in the rear B of the body 10. The groove is closed by the plate 21. The ring gear is provided with a flat rear side 82 which slidably engages the inner face 83 of the plate 21, and is further provided with a flat inner side 84 which engages the inner side 85 of the groove 44. The ring gear 43 is arranged to mesh with gears 45 formed on the heads 39 of the screws 37. The portions of the guideways 17 housing the heads 39 of the screws and the gears 45 are closed by means of an annular plate 46 mounted on the front of the body 10.

The fluid pressure actuating means includes, generally, a plunger or piston 41 on each screw 37, cylinders 47 formed in the body coaxial with the guideways 17, and a fluid pressure connection 70 between the cylinders.

Each cylinder 47 is outward of or beyond the guideway 17 and is closed at its outer end. The stem 40 of the screw extends longitudinally through the cylinder 47 and passes out of the cylinder through the opening 42 in the wall 42ª. The outer end of the cylinder is sealed by means of a cup washer or cup leather 48 maintained in sealing position by means of a ring 49. The ring 49 is held by means of screws 50, screw threaded into the ring and extending outwardly through the body to the periphery of the body. The washer 48 is provided with flanges which engage the stem and the wall of the cylinder.

The piston 41 is fixed on the stem 40 to slidably move within the cylinder 47. The piston includes two annular sections 51 and 52. Section 51 seats against a shoulder 90 of the head 39, while section 52 is screw threaded on the stem and clamps the section 51 against the shoulder 90. A cupped washer or leather 53 is carried between the two sections of the piston, and is arranged with its flanges extending outwardly in engagement with the wall of the cylinder. The outer face 55 of the screw threaded section 52 is provided with notches 54 adapted to permit the section 52 to be turned or threaded on the stem by means of a suitable tool. The outer face 55 is adapted to engage the ring 49 at the outer end of the cylinder, when the screw 37 is operated to clamp the block 18 against a piece of work.

The fluid pressure connection 70 includes a pipe 70ª at the rear of the body. The pipe connects with the outer end portions of the several cylinders through ports 56.

The invention provides means for supplying fluid pressure to the construction above described. I have shown a pump 60, a reservoir 61 for holding a suitable liquid, and a pressure accumulator 62. These parts are preferably mounted on the rear of the body.

The pump 60 may be a hand-operated plunger type of pump as shown in the drawings. The pump illustrated includes a cylinder 63, a plunger 63ª, an operating handle 64, intake valve chest 65, an outlet valve chest 66, and other parts commonly found in pumps of this type.

The reservoir illustrated is mounted on the body 10 by means of straps 68. The reservoir is connected to the intake valve chest of the pump 60 by means of a pipe connection 92.

The pressure connection pipe 70ª extends around the rear side of the body and is connected with the outlet valve chest of the pump. A return connection 94 having a control valve 95 connects the connection 70 with the pipe 92 so that fluid may be allowed to discharge from the cylinders into the reservoir.

The pressure accumulator 62 provided to maintain pressure in the connection 70ª after the pump has been operated is mounted on the body 10, and is connected with the connection 70. The accumulator includes a mounting bracket 72 consisting of a base portion 72ª and a flange portion 72ᵇ extending outwardly from the base portion. The base portion 72ª is mounted on the body 10 by means of bolts 73. A cylinder 74 projects from the flange part 72ᵇ of the bracket 72. The cylinder carries a piston or plunger 76. The piston projects from the inner end of the cylinder through the flange part 72ᵇ of the bracket. The connection pipe 70ª enters the outer end of the cylinder. The projecting portion of the plunger carries a cross head 77 fixed on the plunger by means of a nut 78. The cross head 77 is guided by means of guides 79 in the form of bolts projecting from the flange portion of the bracket. A stop plate 80 is carried on the outer ends of the guides 79. Heavy coil springs 81 are carried between the cross head 77 and the stop plate 80 by the guides 79. The cross head is slidably guided by the guides 79 and is urged inwardly by the springs 81. The plunger acts against the fluid in the pipe line, and as the pressure increases in the pipe line the plunger is forced inwardly in the cylinder and the springs 81 are further compressed.

In operation the device is mounted on a lathe or like machine, and the object to be gripped by the chuck is arranged between the jaws 11. The jaws 11 are actuated against the object by turning one of the screws 17 which causes the ring gear 43 to actuate the other screws thereby simultaneously operating all of the jaws to engage the object. When the screws have actuated the jaws against the object until the screws are difficult to move manually and it is desired to more securely grip the object, fluid pressure is developed by actuating the pump 60, first making certain that the valve 95 is closed. The pressure developed by the pump 60 is directly applied to the pistons 41 through the connection 70. The fluid pressure exerted against the pistons 41 tends to urge the jaws 11, carried by the screws, against the object engaged by the jaws. Great pressure can be exerted on the pistons 41 by this means and this pressure is directed against the object gripped by the jaws. The fluid pressure acting directly on the screws 37 puts the screws 37 under a high compression strain. When the jaws are actuated by the manual means to grip the work, the threads of the screws 37 react with the threads of the opening 20 to cause the screws to move outwardly as far as the play or clearance in the mechanism permits. It will be obvious that the screws are forced to their outermost positions when rotated so that the jaws are in pressure engagement with the part to be gripped. In practice the parts, including the ring gear 43 and pinions 45, are fitted so that the screws are allowed a certain amount of longitudinal movement. When it is desired to grip a piece of work more securely or firmly than is possible by means of the screw or manual means, fluid under pressure is delivered to the cylinders 47 to act on the pistons 52. The screws having been moved outwardly as far as possible when the manual means was tightened, are in position to be moved inwardly under the influence of the fluid pressure enough to tighten the grip on the work. To remove the fluid pressure from the pistons the valve 95 is opened allowing the fluid to flow into the reservoir. The pressure accumulator 72 maintains the pressure in the connection 70 and the cylinders 47 when fluid pressure is employed.

Having described only a typical preferred form of my invention, I do not wish to limit myself to the specific details set forth, but wish to reserve to myself any changes or variations that may appear to those skilled in the art or fall within the scope of the following claims.

Having described my invention, I claim:

1. A chuck of the character described including, a body, jaws slidably carried by the body to move radially with reference to the body, interconnected manual means operable to simultaneously initially actuate the jaws, and fluid pressure means in the body operable to actuate the jaws after actuation by the manual means.

2. A chuck of the character described including, a body, clamping jaws slidably carried by the body to move radially of the body, means manually operable to simultaneously initially actuate the jaws, and fluid pressure means operable to actuate the jaws after actuation by the manual means, said fluid pressure means including a piston connected to a jaw and operable in a cylinder in the body.

3. A device of the character described including, a body, clamping jaws carried by the body to move radially of the axis of the body, means manually operable to initially actuate the jaws and including a screw, and fluid pressure means operable to actuate the jaws after actuation by the manual means, the fluid pressure means including a piston on the screw.

4. A device of the character described including, a body, clamping jaws slidably carried by the body, means manually operable to initially actuate the jaws including, a screw threaded member threaded into a clamping jaw, and fluid pressure means operable to actuate the jaws after actuation by the manual means including a piston on the screw threaded member operable in a cylinder in the body.

5. A device of the character described including, a body, clamping jaws slidably carried by the body, a screw radially disposed within the body operable to initially actuate a jaw radially of the body, and fluid pressure means for operating the jaw after actuation by the manual means including a piston to operate radially of the axis of the body in a cylinder in the body, said piston being formed of two sections, one section screw threaded on the screw.

6. In a device of the character described, a body, a plurality of clamping jaws slidably carried by the body to operate radially of the body, means manually operable to simultaneously initially actuate the clamping jaws, said means including screws radially disposed within the body adapted to engage a jaw, a ring gear carried by the body, and a pinion on each screw meshing with the gear, and fluid pressure means operable to actuate the jaws after actuation by the manual means including a piston to operate radially of the body in a cylinder in the body.

7. In a chuck, a body, a plurality of clamping jaws slidably carried by the body, each jaw including a block and gripping element detachably mounted on the block, and fluid pressure means on the body to operate the jaws including a plurality of pistons operable in cylinders in the body, and members connecting the pistons to the blocks.

8. In a chuck, a body, a plurality of clamping jaws slidably carried by the body, each jaw including, a block and a gripping element detachably mounted on the block, dies in the gripping element, fluid pressure means to operate each jaw including a piston operable in a cylinder in the body, and a member directly connected to the jaw and carrying the piston, said member acting under compression when the jaw is actuated.

9. In a device of the character described, a body, a plurality of clamping jaws slidably carried by the body to move radially of the body, each jaw including a block and a gripping element detachably mounted on the block, means manually operable to initially actuate the jaws including, a screw radially disposed in the body, fluid pressure means to actuate the jaws after actuation by the manual means including, a piston, a member to act under compression connecting the piston and said screw, the said piston being carried directly on said member.

10. In a chuck of the character described, a body, gripping jaws carried by the body, interconnected manual means to simultaneously actuate the griping jaws, fluid pressure means to actuate the gripping jaws after actuation by the manual means, and means on the body to develop fluid pressure for actuating the fluid pressure means.

11. In a chuck of the character described, a body, gripping jaws carried by the body, manual means to initially actuate the gripping jaws, fluid pressure means in the body to actuate the gripping jaws after actuation by the manual means including a piston carried in the body and means connecting the piston and a gripping jaw, and means on the body to develop fluid pressure, said means including a reservoir, and a pump.

12. In a device of the character described, a body, gripping jaws carried by the body, interconnected manual means to initially actuate the gripping jaws, fluid pressure means to actuate the jaws after actuation by the manual means including, a piston carried in a cylinder in the body, and means connecting the piston and a gripping jaw, and means on the body to develop fluid pressure including, a reservoir, a pump, a pipe line connecting the reservoir, pump, and the cylinder, and a pressure accumulator in the pipe line.

13. In a device of the character described, a body, gripping jaws carried by the body, fluid pressure means to actuate the jaws including, a piston carried in a cylinder in the body and means connecting the piston and a gripping jaw, means on the body to develop fluid pressure including, a reservoir, a pump a pipe line connecting the reservoir, pump, and the cylinder, and a pressure accumulator in the pipe line, said accumulator having a spring actuated plunger.

14. In a device of the character described, a body, gripping jaws carried by the body, fluid pressure means to actuate the jaws including, a piston carried in a cylinder in the body, means connecting the piston and a gripping jaw, means on the body to develop fluid pressure including a reservoir, a pump, a pipe line connecting the reservoir, pump, and the cylinder, and a pressure accumulator in the pipe line, said accumulator including, a cylinder, a plunger in the cylinder, and a spring urging the plunger against the fluid.

15. In a device of the character described, a body, a plurality of gripping jaws carried by the body, each gripping jaw having a block with an end and a side, gripping elements adapted to be detachably mounted on either the ends or the sides of the jaws, fluid pressure means on the body to simultaneously actuate the jaws, and means on the body to develop fluid pressure including, a pump to develop pressure, a reservoir for fluid, and a pressure accumulator.

16. In a device of the character described, a body, gripping jaws slidably carried by the body, means manually operable to initially actuate the gripping jaws including a member having a screw threaded body, a head and a stem projecting from the head, the screw threaded body being screw threaded into a gripping jaw and the stem extending beyond the body, fluid pressure means operable to actuate the jaws after their actuation by the manual means including a piston mounted on the stem, and means on the body to develop fluid pressure for operating the piston.

In witness that I claim the foregoing I have hereunto subscribed my name this 2nd day of December, 1928.

BENJAMIN W. SUNDE.